(12) United States Patent
Grohn

(10) Patent No.: US 6,925,072 B1
(45) Date of Patent: Aug. 2, 2005

(54) SYSTEM AND METHOD FOR TRANSMITTING CONTROL INFORMATION BETWEEN A CONTROL UNIT AND AT LEAST ONE SUB-UNIT

(75) Inventor: Ossi Ilari Grohn, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 814 days.

(21) Appl. No.: 09/631,474

(22) Filed: Aug. 3, 2000

(51) Int. Cl.[7] ............................ H04J 3/00; H04L 12/43
(52) U.S. Cl. ...................................... 370/336; 370/461
(58) Field of Search ........................... 370/310–310.02, 370/312, 328, 329, 336, 337, 347, 349, 357, 369, 375, 376, 384, 432, 442, 458, 461, 462

(56) References Cited

U.S. PATENT DOCUMENTS 5,251,216 A * 10/1993 Marshall et al. ............. 370/337
5,274,642 A * 12/1993 Widjaja et al. ............... 370/411
5,307,347 A * 4/1994 Duault et al. ................. 370/439

FOREIGN PATENT DOCUMENTS

| EP | 0830041 | A2 |   | 3/1998 | |
|----|---------|----|---|--------|---|
| EP | 0889611 | A1 |   | 1/1999 | |
| EP | 0948221 | A2 | * | 10/1999 | ............ H04Q/7/00 |
| EP | 0993207 | A2 |   | 4/2000 | |
| EP | 0993207 | A2 | * | 4/2000 | ............ H04Q/7/30 |
| WO | WO94/22245 | | | 9/1994 | |

* cited by examiner

Primary Examiner—Hassan Kizou
Assistant Examiner—Gregory Sefcheck
(74) Attorney, Agent, or Firm—Coats & Bennett, P.L.L.C.

(57) ABSTRACT

A system and method for sending control information between a control unit and at least one of a plurality of cascaded units (CU) connected via a time-multiplexed communications link comprises generating an information message of a predetermined length at a message generator including a CU identifier value and control information, where the CU identifier value corresponds to a designated CU. The information message is sent to a current CU using the time multiplexed communications link. The information message is processed at the current CU, including determining whether the CU identifier value matches the identity of the current CU where the information message is a downlink message.

23 Claims, 5 Drawing Sheets

SYSTEM AND METHOD FOR TRANSMITTING CONTROL INFORMATION BETWEEN A CONTROL UNIT AND AT LEAST ONE SUB-UNIT

BACKGROUND OF THE INVENTION

The present invention is directed toward communications systems, and more particularly, toward a system and method for transmitting control information between a control unit and at least one sub-unit of at least one cascaded unit coupled to the control unit.

Certain communications systems are used in buildings, for example, airports, public buildings, corporate offices, etc. to provide cellular service to building occupants as radio signals often do not penetrate the structure of many buildings. One such communication system is the Ericsson RBS 884 Pico Base Station, where control and voice information is transmitted between a control and radio interface unit and a group of, for example, four radio heads typically located within a particular building structure using a T1 communications link. The Ericsson RBS 884 Pico Base Station may support up to eleven radio heads. The control information is transmitted within a T1 frame as High-level Data Link Control (HDLC) frames including a Link Access Procedure on the D-Channel (LAPD) format. Each radio head includes 4 radio transceivers, where each transceiver is able to service 3 mobile terminals, for example, cellular telephones.

A T1 frame comprises 24 time slots of information, 6 consecutive time slots of information for each radio head serviced by the control and radio interface unit. Each set of 6 consecutive time slots contains 2 control time slots of information, time slots 1 and 4, for transmitting control information between the control and radio interface and the transceivers within the respective radio head. Time slot 1 services the first and second transceivers of the radio head, and time slot 4 services the third and fourth transceivers of the radio head. The set of 6 consecutive time slots further includes 4 voice time slots, time slots 2,3,5 and 6, where each voice time slot is used to transmit voice information between the control and radio interface and a corresponding transceiver of a radio head.

As mentioned, the control time slots transmit control information between the control and radio interface and a particular radio head using an HDLC frame in LAPD format. The HDLC frame includes an address field having a Terminal Endpoint Identifier (TEI) location identifying a particular transceiver for which the control information is intended in the case of a downlink message from the control and radio interface unit and the radio head, and identifying a particular transceiver from which the control information is sent in the case of an uplink message from the radio head to the control and radio interface unit.

The control information transmitted is a minimum of 8 bytes of information in an HDLC frame between the control and radio interface unit and a radio head. Each time slot of the T1 frame contains 1 byte of information to be transmitted between the control and radio interface unit and the radio heads. Thus, where it is desired to transmit control information in an HDLC frame between the control and radio interface and a first transceiver of the first radio head, the control information is placed in the HDLC frame of the first time slot for the first radio head, specifying the first transceiver in the TEI location. However, as only one byte of the HDLC frame is transmitted per T1 frame, transmission of the entire HDLC frame requires a minimum of eight T1 frames. This is the case even where other transceivers, and their corresponding time slots in the T1 frame, are not in use.

SUMMARY OF THE INVENTION

In accordance with the invention, there is disclosed a system and method for generating an information message including a control portion having a cascade unit (CU) identifier value and control information. The control portion of the information message is shared by one or more CUs, and transmits multiple time multiplexed timeslots of control information between the CU and a control unit in a time multiplexed frame.

In one aspect of the invention, a system and method are provided for sending control information between a control unit and at least one of a plurality of cascaded units (CU) via a time-multiplexed communications link comprising a message generator. The message generator generates an information message including a CU identifier value and control information, where the CU identifier value corresponds to a designated CU and the message generator resides in the control unit if the information message is a downlink message, and the message generator resides in an initiating CU of the plurality of CUs where the information message is an uplink message. The system and method further includes a current CU of the plurality of CUs having a current CU identity for receiving the information message, and processing the information message to determine if the CU identifier value matches the current CU identity where the information message is the downlink message.

In another aspect of the invention, a system and method are provided for sending information between a control unit and at least one of a plurality "N" cascaded units (CU) connected via a time-multiplexed communications link. The system and method include a message generator for generating an information message including a control portion and a voice portion, a control portion including a plurality of consecutive timeslots of the time multiplexed communications link having a CU identifier value and control information, the CU identifier value corresponding to a designated CU, and the message generator residing in the control unit where the information message is a downlink message and the message generator residing in an initiating CU of the plurality of CUs where the information message is an uplink message. A current CU of the plurality of CUs has a current CU identity and receives the information message, and processes the information message where the information message is the downlink message to determine if the CU identifier value matches the current CU identity, and alters the CU identifier value, and forwards the information message to a next CU of the N CUs. The next CU processes the control portion of the information message where the information message is the downlink message by determining whether the CU identifier value matches the identity of the next CU, altering the CU identifier value, and forwarding the information message until all of the N CUs have processed the control portion of the information message where the information message is the downlink message.

In another aspect of the invention, a time-multiplexed information message for transmission between a control unit and at least one of a plurality of cascaded units (CU) via a time-multiplexed communications link is provided. The time multiplexed information message includes a control portion including a plurality of consecutive control timeslots of the time multiplexed communications link having a CU identifier value and control information, the CU identifier value corresponding to a designated CU, and a voice portion adjacent the control portion and comprising plural consecutive sub-portions, one sub-portion for each CU.

DETAILED DESCRIPTION OF THE INVENTION

A system and method are provided for sending control information between a control unit and a cascaded unit (CU) using a time multiplexed communications link, and more specifically, to at least one sub-unit (SU) within the CU. Each CU has a corresponding CU identity. An information message of a predetermined length of consecutive timeslots of the time multiplex communications link is generated. Where the information message is a downlink message for sending information from the control unit to a CU, a message generator within the control unit generates the downlink message including a CU identifier value and control information, where the CU identifier value corresponds to a designated CU for which the control information message is intended. The downlink message is processed at a current CU to determine whether the CU identifier matches the identity of the current CU. A match indicates that the downlink message is meant for the current CU. Where the information message is an uplink message for sending information from a CU to the control unit, a message generator of the CU generates the uplink message including a CU identifier value and control information, where the CU identifier value corresponds to the CU from which the uplink message is generated. The uplink information message is processed at the current CU.

Figure 1:
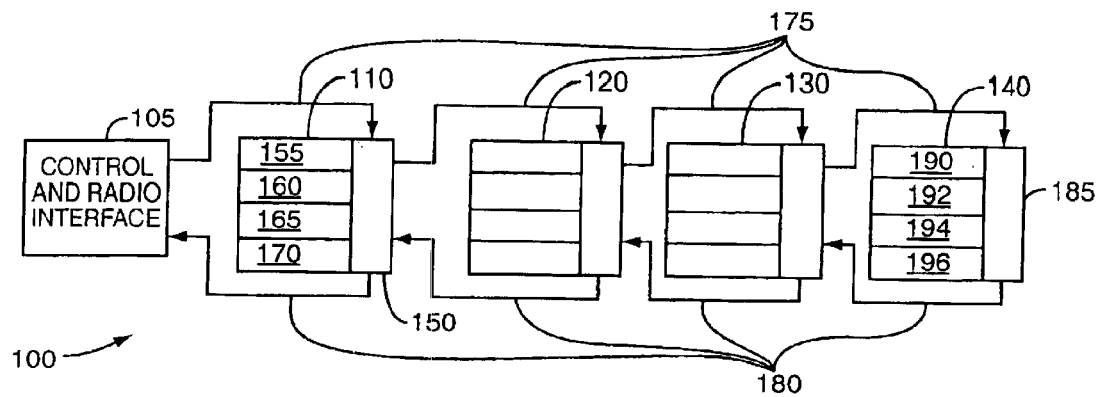
FIG. 1 is a block diagram of a communications system in accordance with the prior art.

FIG. 1 is a block diagram of a communications system 100 in accordance with the prior art, for example an Ericsson RBS884 Pico Base Station. The communications system 100 includes a control and radio interface 105, and four radio heads, a radio head 110, a radio head 120, a radio head 130 and a radio head 140, where the radio heads are coupled to the control and radio interface 105 via T1 or E1 links. Each radio head is identical, and includes for example a communications interface 150 which is coupled to four radio transceivers, a first transceiver 155, a second transceiver 160, a third transceiver 165, and a fourth transceiver 170. Each of the transceivers 155, 160, 165 and 170 has capabilities for communicating with up to three (3) mobile terminals, or cellular telephones, at a time. As mentioned, information is transmitted between the control and radio interface 105 and the radio heads 110, 120, 130 and 140 via T1 or E1 links. The T1 or E1 links may be, for example, T1 downlinks 175 for transmitting downlink messages from the control and radio interface 105 and the radio heads 110, 120, 130 and 140, and T1 uplinks 180 for transmitting uplink messages from the radio heads 110, 120, 130 and 140 to the control and radio interface 105. Information is transmitted between the control and radio interface 105 and the radio heads 110, 120, 130 and 140 via a T1 frame, shown in FIGS. 2a and 2b.

Figure 2:
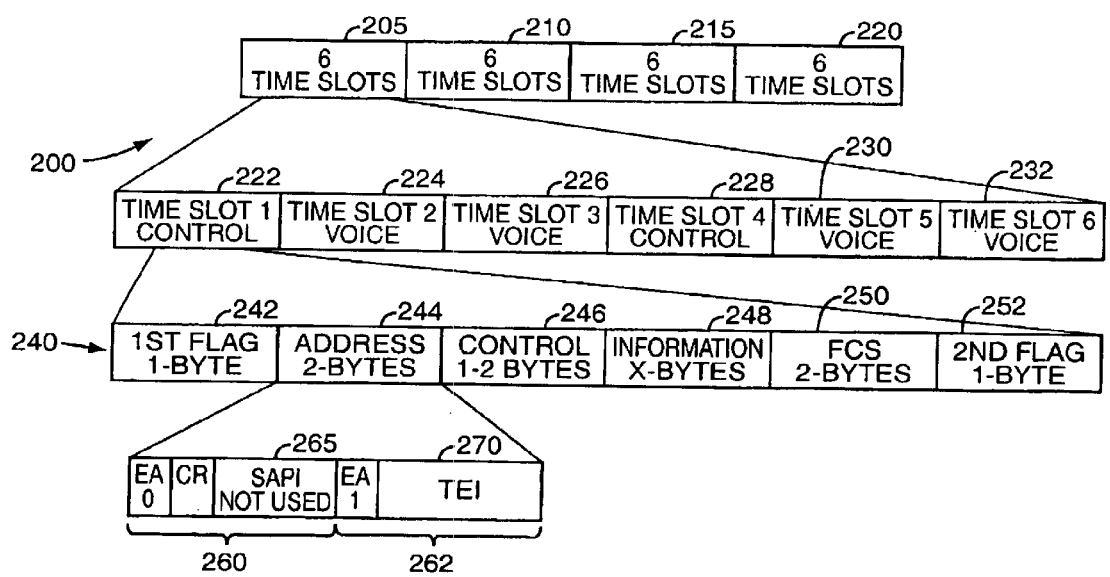
FIG. 2 illustrates a T1 downlink frame in accordance with the prior art.

FIG. 2 illustrates a T1 frame 200 in accordance with the prior art. The T1 frame 200 comprises 24 timeslots of information. The T1 frame 200 is divided into four (4) portions, a first portion 205, a second portion 210, a third portion 215 and a fourth portion 220 for providing information to the first, second, third and fourth radio heads 110, 120, 130 and 140 respectively. Each portion contains six (6) timeslots of the 24 timeslot T1 frame 200. For example, the first portion 205 includes a first timeslot 222, a second timeslot 224, a third timeslot 226, a fourth timeslot 228, a fifth timeslot 230 and a sixth timeslot 232. The second, third, fifth and sixth timeslots 224, 226, 230 and 232 are voice timeslots for transmitting voice information between the control and radio interface 105 and the first radio head 110. More specifically, the the second, third, fifth and sixth timeslots 224, 226, 230 and 232 provide voice information for the first, second third and fourth transceivers 155, 160, 165 and 170 of the first radio head, respectively. The first and fourth timeslots 222 and 228 are control timeslots for transmitting control information between the control and radio interface 105 and the first radio head 110. The first timeslot 222 is used to carry control information for the communications interface 150 and the first and second transceivers 155 and 160. The fourth timeslot 228 carries control information for the third and fourth transceivers 165 and 170. The control information of the first and fourth timeslots 222 and 228 each form a high-level data link control (HDLC) frame, for example an HDLC frame 240 including a Link Access Procedure on the D-Channel (LAPD) format.

The HDLC frame 240 includes a flag field 242 identifying a particular HDLC frame, an address field 244 and a control field 246 used in establishing communication between the control and radio interface 105 and the corresponding radio head (here, the radio head 110), an information field 248 for transmitting the control information, an FCS field 250 used for detecting errors in the transmitted HDLC frame, and a second flag field 252 signaling the end of the HDLC frame 240. The address field 244 includes two (2) bytes of information, a first byte 260 and a second byte 262. The first byte 260 includes a Service Access Point Identifier (SAPI) location 265, not used in current systems, and a Terminal End-Point Identifier (TEI) location 270, identifying a particular transceiver for which the control information is intended.

In operation, the control and radio interface 105 generates a downlink message in the form of the T1 frame 200 to provide voice and control information to each transceiver and communications interface of the radio heads 110, 120, 130 and 140. The information message is transmitted serially to the communications interface 150 via the downlink T1 communications link 175. The T1 frame is stored at the communications interface 150, where the communications interface 150 extracts the first portion 205 of the T1 frame 200, distributing the control information from the first and fourth timeslots 222 and 228 as indicated by the TEI location 270 of the address field 244, and distributing the second, third, fifth and sixth timeslots 224, 226, 230 and 232 to the first, second, third and fourth transceivers 155, 160, 165 and 170 respectively. The communications interface 150 then shifts the second, third and fourth portions 210, 215 and 220 left by one portion such that the second portion 210 is a leftmost portion of the T1 frame 200. The first portion 205 is discarded, and thus not transmitted further. The T1 frame 200 is then transmitted to the communications interface of the second radio head 120 via the T1 communications downlink 175, where it is processed in a similar fashion as in the first radio head 110.

The T1 uplink frame 280 is identical to the T1 downlink frame 200. Specifically, a fourth communications interface 185 of the fourth radio head 140 generates the fourth portion 220 by placing control information in a first timeslot and a fourth timeslot (not shown) corresponding to the fourth portion 220, where a corresponding TEI location of each of the first and fourth timeslots indicates the origin of the control information, for example the fourth control interface 185, or a first transceiver 190, a second transceiver 192, a third transceiver 194 or a fourth transceiver 196 of the fourth radio head 140. Additionally, voice information is collected from the first transceiver 190, the second transceiver 192, the third transceiver 194 and the fourth transceiver 196 and placed into corresponding second, third, fifth and sixth timeslots (not shown) of the fourth portion 220. The fourth portion 220 is placed in the leftmost portion of the uplink frame, and contents of the uplink frame are shifted to the right by one portion. The uplink T1 frame is then transmitted to the communications interface for the third radio head 130 which places its information (the third portion) into the leftmost portion of the uplink T1 frame, and shifts the contents of the uplink T1 frame right by one portion. The uplink T1 frame is transmitted to the communications interface for the second radio head 120, where it is processed in a similar fashion as in the third and fourth radio heads. Thus, once the uplink T1 frame reaches the control and radio interface unit (CRI) 105, the first, second, third and fourth portions 205, 210, 215 and 220 are arranged as shown in T1 frame 200.

Each timeslot of the T1 frame 200 contains one byte of information. Thus, where it is desired to transmit an HDLC frame 240 comprising eight (8) bytes of information to the first transceiver 155 using a downlink T1 frame, it will take eight (8) T1 frames for the control information to reach the first transceiver 155. The same is true where it is desired to transmit control Rio information between the radio heads 110, 120, 130 and 140 and the CRI via an uplink T1 frame.

This is the case regardless of the activity occurring at the other transceivers within the radio heads 110, 120, 130 and 140. Thus, where only one-third of all the transceivers in the radio heads 110, 120, 130 and 140 are currently active, transmission of control information will occur between the control and radio interface 105 and the active one-third of the transceivers one byte at a time within specific corresponding locations of the T1 frame, while the remaining two-thirds of the timeslots are unused. This results in inefficient use of the T1 frame.

Advantages are gained in the invention by providing an information message with a control portion including a CU identifier value and control information including a plurality of consecutive timeslots of a time multiplex communications link, where the control portion is shared by one or more CUs for transmitting control information between the control unit and the plurality of CUs. Providing the information message in this format reduces the number of unused timeslots of the time multiplex communications link, thereby providing a more efficient use of the time multiplex communications link.

Figure 3:
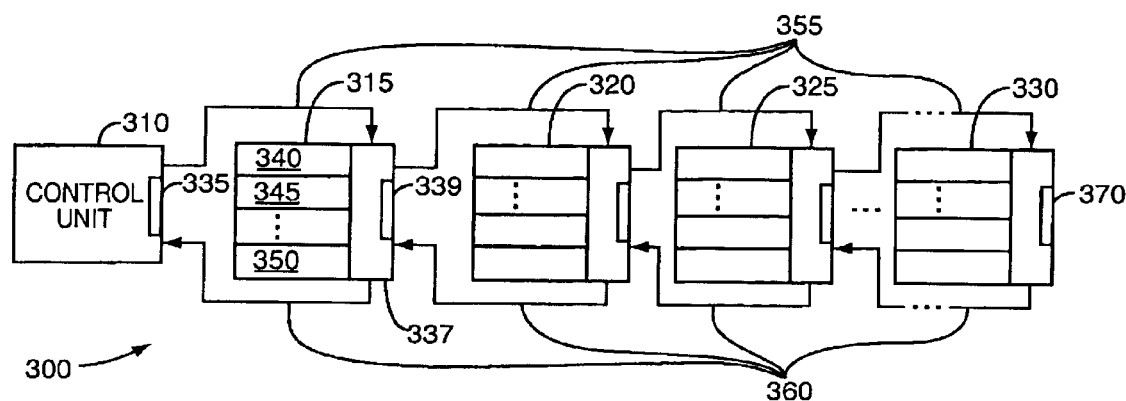
FIG. 3 is a block diagram of a communication system in accordance with an embodiment of the invention.

FIG. 3 is a block diagram of a communications system 300 in accordance with an embodiment of the invention. The communications system includes a control unit 310 connected to N-cascaded units (CU), a first CU 315, a second CU 320, a third CU 325, and an Nth CU 330. The control unit 310 includes a control message generator 335 for generating information messages, more specifically downlink messages, as discussed below. Each CU includes a communications interface, for example a communications interface 337, and a CU message generator, for example a CU message generator 339, for generating information messages, more specifically uplink information messages as discussed below. The CUs further include K sub-units (SU), for example, a first SU 340, a second SU 345, and a Kth SU 350 for communicating with mobile terminals, for example cellular telephones. The control unit 310 is connected to the CUs 315, 320, 325 and 330 via a time multiplex communications downlink 355 and a time multiplex communications uplink 360, each having T timeslots in a frame. The time multiplex communications downlink 355 and the time multiplex communications uplink 360 may be a T1 communications link where T equals 24, or an E1 communications link where T equals 31, as are known in the art. The control unit 310 communicates with the cascaded units 315, 320, 325 and 330 by generating a downlink message using the control message generator 335, which includes a control portion and a voice portion, sent using the time multiplex communications downlink 355. Similarly, the CUs 315, 320, 325 and 330 generate an uplink message using the CU message generator, such as the first CU message generator 339, including a control portion and a voice portion, sent using the time multiplex communications uplink 360. The downlink message and uplink message are discussed with respect to FIG. 4.

Figure 4:
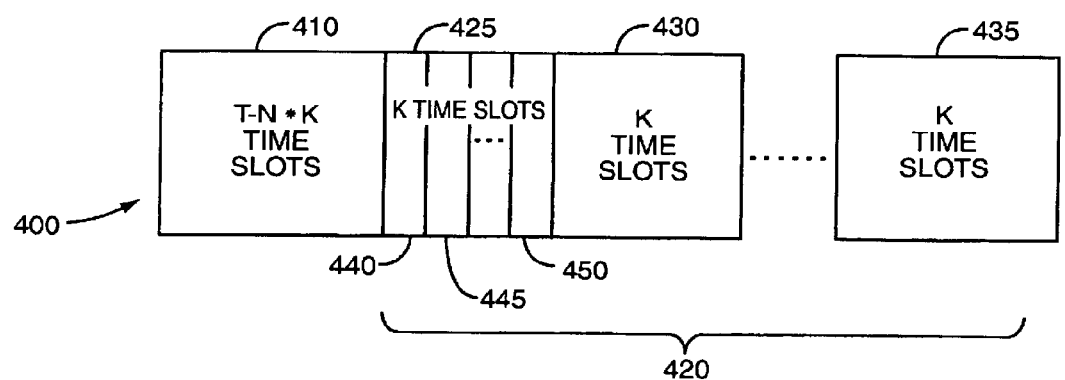
FIG. 4 illustrates an information message utilized with the communications system of FIG. 3 in accordance with an embodiment of the invention.

FIG. 4 illustrates an information message 400 in accordance with an embodiment of the invention. The information message includes a control portion 410 and a voice portion 420. The control portion 410 comprises T−N*K consecutive time slots of the time division multiplex link between the control unit 310 and the CUs 315, 320, 325 and 330, where N is the number of CUs connected to the control unit. For example, where the time division communications link is a T1 communications link, the control portion 410 comprises 24−N*K consecutive timeslots, and where the time division communications link is an E1 communications link, the control portion 410 comprises 31−N*K consecutive timeslots. The voice portion 420 includes a first sub-portion 425 occupying a leftmost location of the voice portion 420, a second sub-portion 430, and an Nth sub-portion 435, N representing the number of cascaded units connected to the control unit 310. Each sub-portion comprises K time slots of the time multiplex communications link, K representing the number of sub-units within each cascaded unit.

The control portion 410 is used for communicating control information between the control unit 310 and the cascaded units 315, 320, 325 and 330. The control portion 410 includes a CU identifier value location for communicating the CU identifier value, an SU identifier value location for communicating the SU identifier value, and control information. Where the information message 400 is a downlink information message for sending information from the control unit 310 to one or more of the CUs 315, 320, 325 and 330, the CU identifier value corresponds to a designated CU for which the control portion of the downlink message is intended, and the SU identifier value corresponds to an SU within the designated CU for which the control information is intended. Where the information message 400 is an uplink information message for sending information from one or more of the CUs 315, 320, 325 and 330 to the control unit 310, the CU identifier value corresponds to an initiating CU of the N CUs from which the control portion of the information message originated, and the SU identifier value corresponds to the SU within the initiating CU corresponding to the control information.

The voice portion 420 is used for communicating voice information between the control unit 310 and the cascaded units 315, 320, 325 and 330, where the first sub-portion 425 is used to communicate voice information to the first cascaded unit 315, the second sub-portion 430 is used to transmit voice information to the second cascaded unit 320, and the Nth sub-portion 435 is used to transmit voice information to the Nth cascaded unit 330. For example, the first voice portion 425 transmits voice information to the first CU 315, where a first voice timeslot 440 carries voice information for the first SU 340 of the first CU 315, a second voice timeslot 445 carries voice information for the second SU 345, and a Kth voice timeslot 450 carries voice information for a Kth sub-unit 350 of the first CU 315. Typically, the information message 400 is transmitted over a T1 communications link in the form of a T1 frame (or E1 frame), further discussed below. Operation of the communications system 300 using the information message 400 is discussed in conjunction with the flowcharts of FIGS. 5 and 6.

Figure 5:
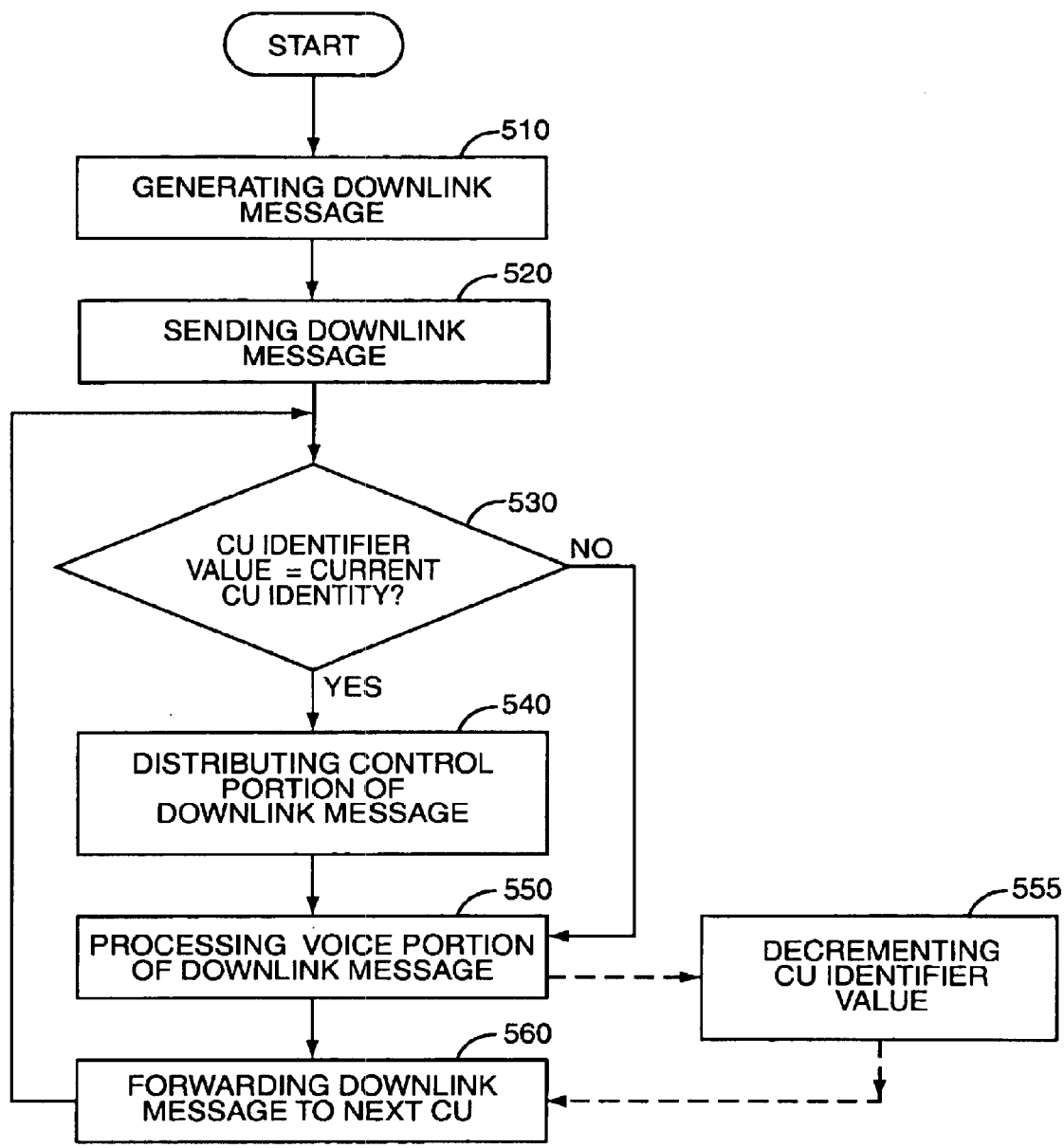
FIG. 5 is a flowchart illustrating generation and processing of a downlink message by the system of FIG. 3.

FIG. 5 is a flowchart illustrating generation and processing of a downlink message in accordance with an embodiment of the invention. The downlink message is generated as shown in step 510 by the control message generator 335 of the control unit 310. The downlink message is generated by placing T–N*K consecutive time slots of information in the control portion 410. The T–N*K timeslots of information include a CU identifier value communicated in the CU identifier value location, an SU identifier value communicated in the SU identifier value location, and control information, where the CU identifier value corresponds to a designated CU for which the control portion 410 is intended, and the SU identifier value corresponds to an SU within the designated CU for which the control information is intended. Additionally, voice information is placed in first, second, and Kth voice time slots 440, 445 and 450 of the first, second, and Nth sub-portions 425, 430 and 435 of the information message 400 for sending voice information to SUs within the first CU 315 through Nth CU 330. The downlink message is sent to the communications interface 337 via the time multiplex communications downlink 355, step 520.

The communications interface 337 buffers the information message, and determines whether the CU identifier value in the CU identifier value location of the control portion 410 matches the identity of the first CU 315, shown in step 530. Where the CU identifier value matches the identity of the first CU 315, the communications interface 337 distributes the control information to the SU identified by the SU identifier value, step 540. Additionally, the communications interface 337 processes the voice portion of the downlink message by retrieving the voice information from the first sub-portion 425, and distributes the first, second and Kth voice timeslots 440, 445 and 450 to the respective SUs 340, 345 and 350 of the first CU 315, shown in step 550. The communications interface 337 then shifts the second sub-portion 430 through the Nth sub-portion 435 left by one portion, and the first sub-portion 425 is discarded, and thus not transmitted further. The communications interface 337 then forwards the downlink message 400 to the communications interface for the second CU 320, step 560, where it is processed in a similar fashion by the method returning to step 530 until all the CUs have processed the downlink message.

Where the CU identifier value does not match the identity of the first CU 315 in step 530, the method continues to step 550 where the voice portion is processed, as discussed above.

In an alternate embodiment shown in dashed lines, the identity of each of the first CU 315 through the Nth CU 330 are designated by the control unit 310 as "1" through "N" respectively. Each CU considers itself to have a local identity of "1". Each respective communications interface of the N CUs additionally processes the information message by decrementing the CU identifier value by "1", step 555, before forwarding the information message on to the next communications interface, shown in step 560. Thus, where the control information within the control portion 410 is intended for the second CU 320 designated as "2" by the control unit 310, the control unit 310 places the value "2" as the CU identifier value, and the first communications interface 337 determines that the CU identifier value, here "2", does not match the local identity "1" of the first CU 315, step 530. The first CU 315 processes the voice portion, step 550, and decrements the CU identifier value of the downlink message from "2" to "1", step 555. The communications interface 337 forwards the downlink message to the communications interface of the second CU 320, step 560. The communications interface of the second CU 320 then determines in step 530 that the CU identifier value, now "1", matches the identity of the second CU 320, also "1", and processes the information message as shown in step 540 and the method continues as discussed above. In this way, each of the CUs may be identical, as when they are installed, the CUs do not need to be configured with a specific CU identity, but rather all have an identical local identity.

Figure 6:
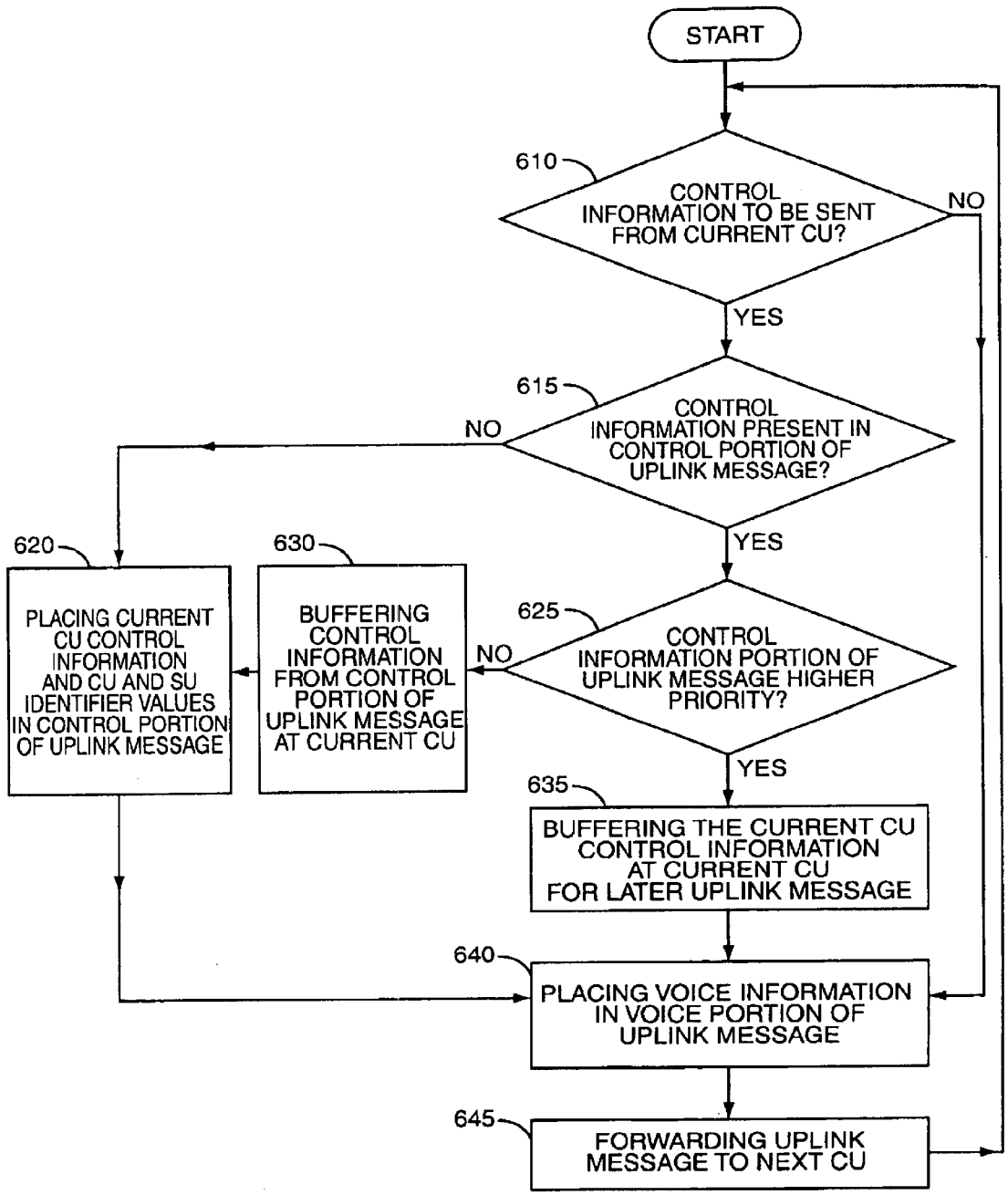
FIG. 6 is a flowchart illustrating generation and processing of an uplink message by the system of FIG. 3.

Additionally, the CUs 315, 320, 325 and 330 generate uplink information messages discussed with respect to the flow chart of FIG. 6.

FIG. 6 is a flowchart illustrating generation and processing of an uplink message 455 in accordance with an embodiment of the invention. The uplink message is identical to the downlink message and is generated in an ongoing manner as the uplink message is transmitted from the Nth CU 330 to the first CU 315 by CU message generators of the CUs 315, 320, 325, and 330. The uplink message is initiated in a CU message generator 370 of the Nth CU 330. In operation, it is determined whether a current CU processing the uplink message has control information to be sent to the control unit 310, step 610. Where the Nth CU has no control information to be placed in the control portion 410, the method continues to step 640 where voice information is placed in the voice portion of the uplink message, discussed below. Where the Nth CU has control information to be placed in the control portion 410, the method continues to step 615 where it is determined whether there is control information present in the control portion of the uplink message. Where there is no control information present in the control portion of the uplink message, the CU message generator of the current CU places control information in the control portion of the uplink message, step 620. This is accomplished where the CU message generator of the current CU places the CU identifier value of the current CU in the CU identifier value location of the control portion 410, the SU identifier value of the current CU in the SU identifier value location of the control portion 410, and control information in the control portion 410. The method continues to step 640, where voice information is placed in the voice portion of the uplink message, discussed below.

Where it is determined that control information exists in the control portion 410 of the uplink message in step 615, the method proceeds to step 625 where it is determined whether the control information in the control portion of the uplink message is of higher priority than the control information of the current CU. The CUs may be prioritized from highest priority at the Nth CU 330 through lowest priority at the first CU 315 such that control information from the Nth CU 330 is of highest priority, and control information from the first CU 315 is of lowest priority. Alternatively, CUs may be prioritized from highest priority at the first CU 315 through lowest priority at the Nth CU 330 such that control information from the first CU 315 is of highest priority, and control information from the Nth CU 330 is of lowest priority. A further alternative would be to give the CUs 315, 320, 325 and 330 variable priority, controlled by the control unit 310 depending on present circumstances. In this alternative, the priority for each CU is communicated to the CU using the downlink messages.

Where it is determined that the control information in the control portion of the uplink message is not of higher priority than the control information of the current CU in step 625, the control information in the control portion of the uplink message is buffered in the communications interface of the current CU, step 630, and the method continues to step 620 where the current CU control information is placed in the control portion of the uplink message as discussed above. Where it is determined that the control information in the control portion of the uplink message is of higher priority in step 625, the current CU control information is buffered in the communications interface of the current CU until a later uplink message is processed by the current CU, shown in step 635. Following steps 620 and 635, the method continues to step 640 where the voice information from the current CU is placed in the voice portion of the uplink message.

In step 640, voice information from the current CU is placed in the voice portion of the uplink message. All voice sub-portions are shifted to the right by one sub-portion where the rightmost sub-portion is discarded, and the voice information from the current CU is placed in the leftmost sub-portion of the voice portion 470 by the current CU message generator.

For example, in FIG. 4, the Nth CU message generator shifts all voice sub-portions 425, 430 and 435 to the right by one sub-portion where the rightmost sub-portion 435 is discarded, and voice information from the Nth CU 330 is placed in the leftmost sub-portion of voice portion 420.

After the voice information is placed in the voice portion, the uplink message is forwarded to a next (current) CU, step 645, and the method returns to step 610 and repeats until all CUs have processed the uplink message.

In an alternate embodiment (not shown) the identity of each of the CUs 315 through 330 are designated by the control unit as "1" through "N" respectively. Each CU considers itself to have a local identity of "1". The CU generating the control portion 410 of the uplink information message places the CU local identity value "1" as the CU identifier value of the control portion 410. When the uplink information message is transmitted to the next CU in the cascaded chain of CUs, the CU message generator (defining a CU identifier value modifier) of the CU increments the value of the CU identifier value by "1" and further forwards the uplink information message. Thus, the control unit 310 is able to determine from which CU the control information of the control portion 460 is received using the value of the CU identifier value when the uplink information message 455 is received at the control unit 310.

Figure 7:
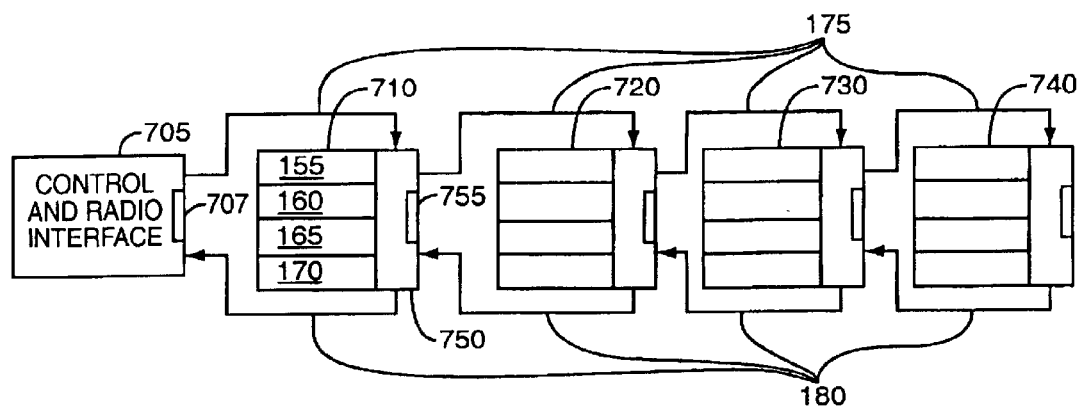
FIG. 7 is a block diagram of a communications system in accordance with another embodiment of the invention.

FIG. 7 is a block diagram of a communications system 700 in accordance with another embodiment of the invention. The communications system 700 is very similar to the Ericsson RBS 884 Pico Base Station shown in FIG. 1, except the control unit, here a control and radio interface 705 includes a control message generator 707 sufficiently programmed for generating information messages in the format shown in FIG. 4, and the CUs, here radio heads 710, 720, 730 and 740, which are connected to the control and radio interface 705 via a T1 or E1 communications link, each include a CU message generator, for example the CU message generator 755, programmed for generating uplink information messages in the format described above with respect to FIG. 4. Accordingly, components of FIG. 7 identified by reference numerals identical to those of FIG. 1 are the same and will not be discussed in detail.

Each radio head includes a CU message generator, for example the CU message generator 755 of the communications interface 750, which is programmed to interpret the downlink information message generated and sent by the control message generator 707 of the control and radio interface 705, and is capable for generating and processing uplink information messages in the format of FIG. 4. Structure of the information message generated by the communications system 700 is shown in FIG. 8.

Figure 8:
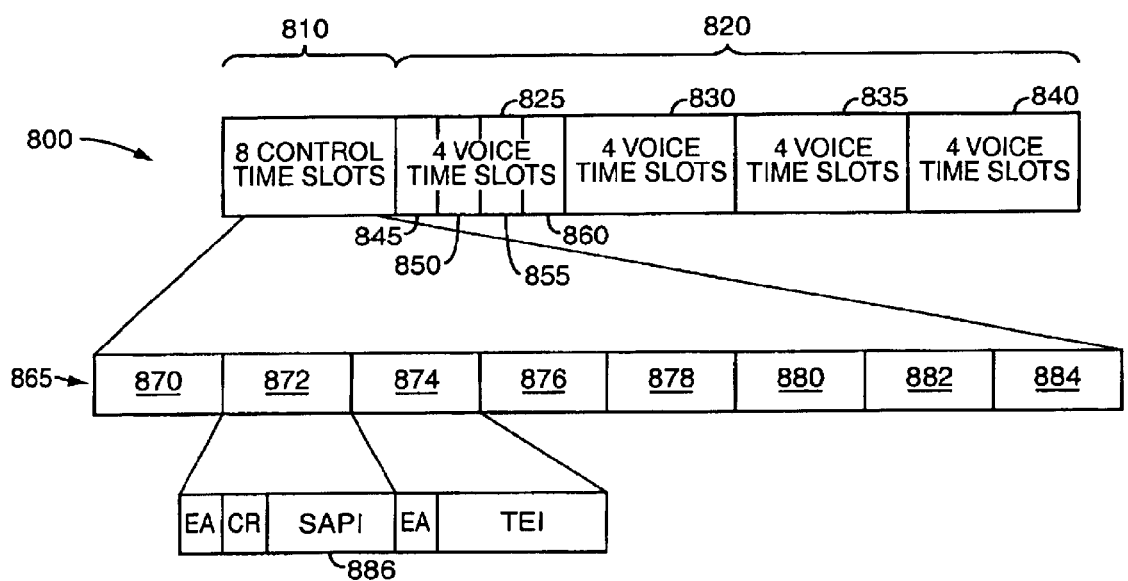
FIG. 8 illustrates an information message utilized with the communications system of FIG. 7 in accordance with an embodiment of the invention.

FIG. 8 illustrates structure of an information message utilized by the communications system 700 in the form of a T1 frame format in accordance with an embodiment of the invention. An information message 800 is transmitted between the control and radio interface 705 and the radio heads 710, 720, 730 and 740 using a T1 communications link, the information message 800 shown as a T1 frame. The information message 800 includes a control portion 810 comprising eight (8) timeslots for transmitting control information between the control and radio interface 705 and the radio heads 710, 720, 730 and 740. The number of control timeslots is calculated by taking T−N*K, where T is 24 for a T1 communications link, N is 4 for each radio head 710, 720, 730 and 740, and K is 4 for each radio transceiver within each radio head. Where the communications link is an E1 communications link, the number of timeslots in the control portion would be 15 as T is 31 for the E1 communications link. The information message 800 further includes a voice portion 820 comprising a first sub-portion 825, a second sub-portion 830, a third sub-portion 835, and a fourth sub-portion 840, where each of the sub-portions 825, 830, 835 and 840 include four (4) voice timeslots (not shown) for transmitting voice information to the radio heads 710, 720, 730 and 740. For example, the voice portion 820 includes first, second, third and fourth voice timeslots 845, 850, 855 and 860 for transmitting voice information to the first, second, third and fourth transceivers 155, 160, 165 and 170 of the first radio head 710.

The control portion 810 comprises eight (8) consecutive timeslots is in the form of an HDLC frame 865 in LAPD format. The HDLC frame 865 is similar to the HDLC frame 240 of FIG. 2. For example, the HDLC frame-865 may include a first flag byte 870 indicating a beginning of the HDLC frame 865, an address field including a first address byte 872 and a second address byte 874, a control field including a control byte 876, an information field including one or more information bytes, for example the information byte 878, an FCS field including a first FCS byte 880 and a second FCS byte 882, and a second flag 884 indicating an end of the HDLC frame 865.

The first and second address bytes 872 and 874 are identical to the first byte 260 and the second byte 262 shown in FIG. 2. However, in accordance with the invention, an SAPI location 886 of the first address byte 872 is used to transmit the CU identifier value, identifying the radio head for which the control information is intended in the case of a downlink information message, and identifying the radio head generating the control information in the case of an uplink information message.

The radio heads 710, 720, 730 and 740 share the control portion to transmit control information between the control and radio interface 705 and the radio heads 710, 720, 730 and 740, unlike radio heads of the prior art, which each had specific control timeslots of the T1 frame assigned to them. In the prior art T1 frame, where less than all of the radio heads were in use, the control timeslots corresponding to radio heads not in use were not used, resulting in inefficient use of the prior art T1 frame. In contrast, the T1 frame of the invention, having a shared control portion in the T1 frame utilizes the T1 frame more effectively as unused radio heads are not assigned specific timeslots, and thus more timeslots of the control portion are available for the active radio heads.

One skilled in the art would realize that the control message generator and CU message generators may be separate devices from, or part of, processors within the control unit and CUs respectively.

Although it has been disclosed that in a downlink message, each CU extracts the leftmost portion of the voice portion of the information message, and shifts the remaining portions to the left by one sub-portion, one skilled in the art would realize that, alternatively, each CU may extract the rightmost portion of the voice portion of the information message where the remaining sub-portions of the voice portion are shifted to the right by one sub-portion. Similarly, for an uplink message, one skilled in the art would realize that each CU may shift the voice sub-portions to the left by one voice sub-portion, and insert voice information in the rightmost sub-portion of the voice portion of the information message.

Additionally, where it is desired to transmit control information to an SU within a CU containing more timeslots of information than are available in the control portion of a first information message transmitted, the remaining control information may be placed in control portions of consecutive time division multiplex frames, for example T1 frames. In this case, identifiers are used to bound the control information, for example the first and second flag bytes 870 and 884 shown in FIG. 8. When a current CU receives the consecutive T1 frames, the control portions will be attributed to the SU and CU designated in the first T1 frame until the second flag 884 is received. Additionally, where the second flag 884 occurs in a central timeslot of the control portion of a T1 frame, a new, different set of flag bytes may be used to begin transmission of control information to a different SU within a same or different CU, over one or more additional consecutive T1 frames.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiments as described above would be obtained.

I claim:

1. A method for sending control information between a control unit and at least one of a plurality of cascaded units (CU) comprising:

generating an down link message of a predetermined length comprising a Cu identifier and control information, wherein said CU identifier corresponds to a designated Cu;

sending said downlink message to said designated CU using a common control channel over a time-multiplexed communications link, said common control channel comprising a plurality of consecutive timeslots of a time-multiplexed frame; and processing said downlink message at said designated CU;

wherein generating said downlink message comprises:

generating said downlink message in a Link Access Procedure on D-channel (LAPD) format using High Level Data Link Control (HDLC) frames, said HDLC frame including an address field having a Service Access Point Identifier (SAPI) location for transmitting said CU identifier; and placing said CU identifier in said SAPI location.

2. The method of claim 1 wherein processing said downlink message at said designated CU comprises:

extracting said CU identifier from said SAPI location; and comparing said CU identifier with the identity of said designated CU to determine whether said CU identifier matches the identity of said designated CU.

3. A method for sending control information between a control unit and at least one of a plurality of cascaded units (CU) comprising:

generating an downlink message of a predetermined length comprising a Cu identifier and control information, wherein said CU identifier corresponds to a designated CU;

sending said downlink message to said designated CU using a common control channel over a time-multiplexed communications link, said common control channel comprising a plurality of consecutive timeslots of a time-multiplexed frame and processing said downlink message at said designated CU;

wherein each CU in said plurality of CUs has an identity of "1," and processing said downlink message at said designated CU comprises altering the CU identifier.

4. The method of claim 3 wherein altering the CU identifier comprises decrementing said CU identifier by "1."

5. A method for sending control information between a control unit and at least one of a plurality of cascaded units (CU) comprising:

generating an downlink message of a predetermined length comprising a CU identifier and control information, wherein said CU identifier corresponds to a designated CU;

sending said downlink message to said designated CU using a common control channel over a time-multiplexed communications link, said common control channel comprising a plurality of consecutive timeslots of a time-multiplexed frame; and processing said downlink message at said designated CU;

wherein each CU comprises at least one sub-unit (SU) having an SU identity within said CU, and said downlink message further comprises an SU identifier corresponding to a designated SU in said designated CU;

wherein generating said downlink message comprises:

generating said downlink message in a Link Access Procedure on D-channel (LAPD) format using High Level Data Link Control (HDLC) frames, said HDLC frame comprising an address field with a Service Access Point Identifier (SAPI) location and a Terminal Endpoint Identifier (TEI) location for transmitting said CU identifier and said SU identifier, respectively; and placing said CU identifier and said SU identifier in the SAPI and TEI locations, respectively.

6. The method of claim 5 wherein processing said downlink message at said designated CU comprises:

extracting said CU identifier from the SAPI location of the address field; and comparing said CU identifier with the identity of said designated CU to determine whether said CU identifier matches the identity of said designated CU.

7. The method of claim 6 further comprising:

if said CU identifier matches the identity of said designated CU, extracting said SU identifier from the TEI location of the address field; and forwarding said control information to said designated SU specified by said SU identifier.

8. A method for sending control information between a control unit and at least one of a plurality of cascaded units (CU) comprising:

generating an downlink message of a predetermined length comprising a CU identifier and control information, wherein said CU identifier corresponds to a designated CU;

sending said downlink message to said designated CU using a common control channel over a time-multiplexed communication link, said common control channel comprising a plurality of consecutive timeslots of a time-multiplexed frame; and processing said downlink message at said designated CU;

wherein said common control channel has a length of T−N*K consecutive timeslots in a time multiplexed frame, wherein T is the number of timeslots per frame, N is the number of CUs, and K is the number of sub-units (SU) within each CU.

9. A method for sending control information between a control unit and at least one of a plurality of cascaded units (CU) comprising:

receiving an uplink message of a predetermined length at a designated CU, said uplink message comprising a CU identifier and control information, wherein said CU identifier corresponds to said designated CU;

said uplink message sent to said designated CU using a common control channel over a time-multiplexed communications link, wherein said common control channel comprises a plurality of consecutive timeslots of a time-multiplexed frame; and processing said uplink message designated CU to be forwarded to a next CU;

wherein said uplink message is in a Link Access Procedure on D-channel (LAPD) format using High Level Data Link Control (HDLC) frames, said HDLC frame including an address field having a Service Access Point Identifier (SAPI) location for transmitting said CU identifier.

10. The method of claim 9 wherein processing said uplink message at said designated CU comprises determining if there is already control information present in said uplink message.

11. The method of claim 10 wherein processing said uplink message at said designated CU further comprises placing CU generated control information into said uplink message if there is not already control information present in said uplink message.

12. The method of claim 9 further comprising:

buffering said control information already present in said uplink message at said designated CU if said control information already present in said uplink message is of a lower priority than said CU generated control information; and placing said CU generated control information in said uplink message.

13. The method of claim 12 wherein placing said CU generated control information in said uplink message comprises placing an identifier of said designated CU into said SAPI location of the address field.

14. The method of claim 13 wherein each CU comprises at least one sub-unit (SU) having an SU identity within said CU, and said address field in said HDLC frame further includes a Terminal Endpoint Identifier (TEI) location for transmitting an SU identifier corresponding to a designated SU.

15. The method of claim 14 wherein placing said CU generated control information in said uplink message further comprises placing said SU identifier corresponding to said designated SU in said TEI location of the address field.

16. A method for sending control information between a control unit and at least one of a plurality of cascaded units (CU) comprising:

receiving an uplink message of a predetermined length at a designated CU, said uplink message comprising a CU identifier and control information, wherein said CU identifier corresponds to said designated CU;

said uplink message sent to said designated CU using a common control channel over a time-multiplexed communications link, wherein said common control channel comprises a plurality of consecutive timeslots of a time-multiplexed frame; and processing said uplink message at said designated CU to be forwarded to a next CU;

wherein each CU in said plurality of CUs has an identity of "1," and processing said downlink message at said designated CU into an uplink message comprises altering the CU identifier.

17. The method of claim 16 wherein altering the CU identifier comprises incrementing said CU identifier by "1."

18. A method for sending control information between a control unit and at least one of a plurality of cascaded units (CU) comprising:

receiving an unlink message of a predetermined length at a designated CU, said uplink message comprising a CU identifier and control information, wherein said CU identifier corresponds to said designated CU;

said uplink message sent to said designated CU using a common control channel over a time-multiplexed communications link, wherein said common control channel comprises a plurality of consecutive timeslots of a time-multiplexed frame; and processing said uplink message at said designated CU to be forwarded to a next CU;

wherein said common control channel has a length of T−N*K consecutive timeslots in a time multiplexed frame, wherein T is the number of timeslots per frame, N is the number of CUs, and K is the number of sub-units (SU) within each CU.

19. A system for sending control information between a control unit and at least one of a plurality of cascaded units (CU) connected via a time-multiplexed communications link comprising:

a message generator to generate a control message of a predetermined length, said control message comprising a CU identifier and control information, wherein said CU identifier corresponds to a designated CU; and a transmitter to send said control message using a common control channel comprising a plurality of consecutive timeslots of a time-multiplexed frame over said time-multiplexed communications link;

wherein said message generator generates said control message in a Link Access Procedure on D-channel (LAPD) format using a High Level Data Link Control (HDLC) frame, said HDLC frame comprising an address field with a Service Access Point Identifier (SAPI) location to hold said CU identifier.

20. The system of claim 19 wherein each CU in the plurality of CUs comprises at least one sub-unit (SU) having an SU identity, and said address field in said HDLC frame further includes a Terminal Endpoint Identifier (TEI) location to hold an SU identifier corresponding to a designated SU.

21. A system for sending control information between a control unit and at least one of a plurality of cascaded units (CU) connected via a time-multiplexed communications link, comprising:

a message generator to generate a control message of a predetermined length, said control message comprising a CU identifier and control information, wherein said CU identifier corresponds to a designated CU; and a transmitter to send said control message using a common control channel comprising a plurality of consecutive timeslots of a time-multiplexed frame over said time-multiplexed communications link;

wherein said common control channel has a length of T−N*K consecutive timeslots in a time multiplexed frame, wherein T is the number of timeslots per frame, N is the number of CUs, and K is the number of sub-units (SU) within each CU.

22. A time-multiplexed control message for transmission between a control unit and at least one of a plurality of cascaded units (CU) via a time-multiplexed communications link comprising:

a CU identifier and control information arranged in a common control channel, said common control-channel comprising a plurality of consecutive timeslots of a time-multiplexed frame;

said common control channel shared by each CU in said plurality of CUs;

wherein said common control channel has a length of T−N*K consecutive timeslots in a time multiplexed frame, wherein T is the number of timeslots per frame, N is the number of CUs, and K is the number of sub-units (SU) within each CU.

23. A method for sending information between a control unit and a plurality of cascaded units (CU) comprising:

generating a control message having a CU identifier value and control information, the CU identifier value corresponding to a designated CU;

sending said control message to said designated CU using a common control channel over a time-multiplexed communications link, said common control channel comprising a plurality of consecutive timeslots of a time-multiplexed frame;

processing said control message at said designated CU; and forwarding said control message to a next CU in said plurality of CUs using said common control channel over said time-multiplexed communications link;

wherein said common control channel has a length of T−N*K consecutive timeslots in a time multiplexed frame, wherein T is the number of timeslots per frame, N is the number of CUs, and K is the number of sub-units (SU) within each CU.

* * * * *